UNITED STATES PATENT OFFICE.

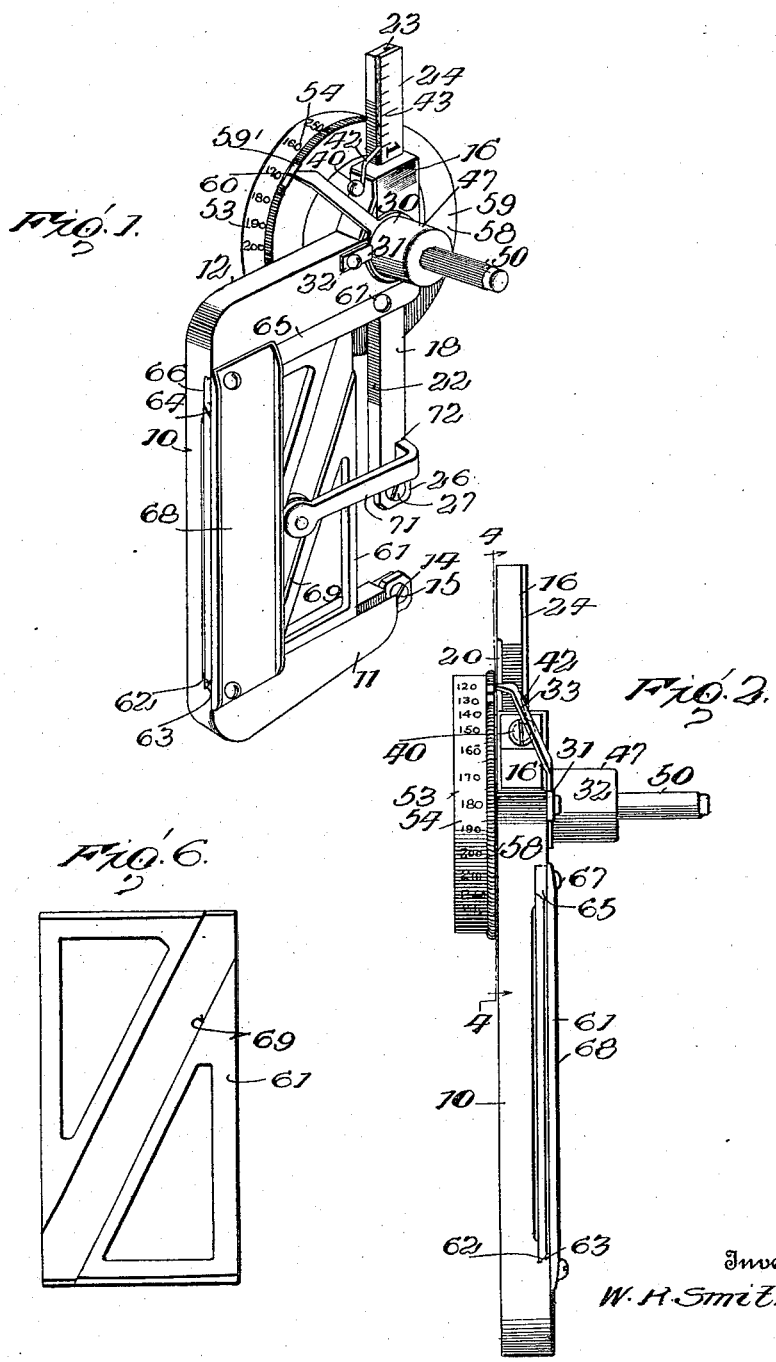

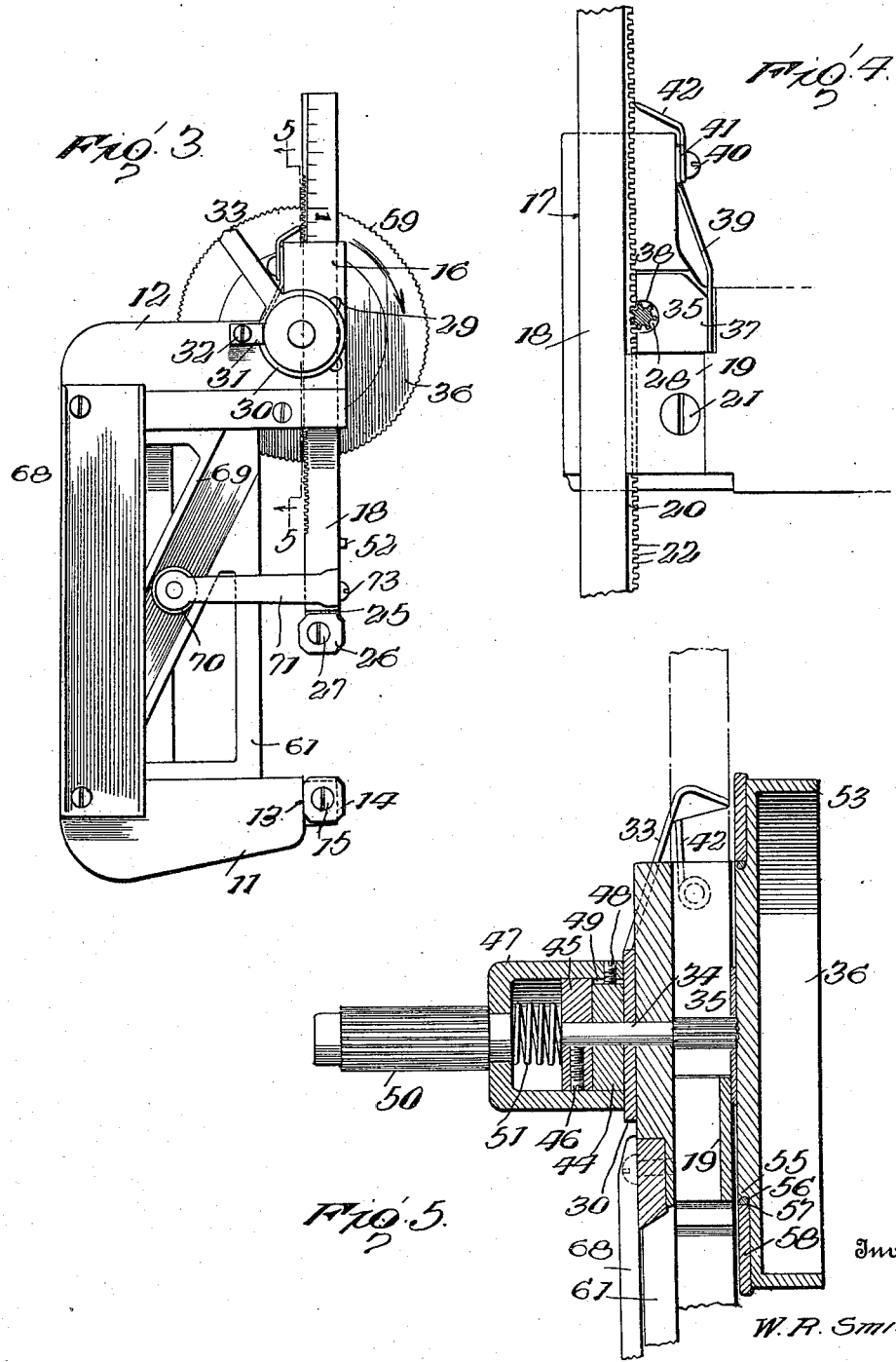

WESTON R. SMITH, OF JACKSON, MICHIGAN, ASSIGNOR OF ONE-HALF TO GEORGE B. GALLUP, OF JACKSON, MICHIGAN.

TOOL FOR MEASURING ROUND WORK.

1,184,392.          Specification of Letters Patent.          Patented May 23, 1916.

Application filed June 29, 1915. Serial No. 37,114.

*To all whom it may concern:*

Be it known that I, WESTON R. SMITH, a citizen of the United States, residing at Jackson, in the county of Jackson and State of Michigan, have invented certain new and useful Improvements in Tools for Measuring Round Work, of which the following is a specification.

My invention relates to new and useful improvements in measuring instruments and more particularly in instruments of the caliper type, the primary object of my invention being the provision of an instrument by means of which round work, while in motion, such as work in a lathe or grinder, may be measured.

More specifically, my invention includes a body having a fixed work engaging jaw and a movable work engaging jaw actuated by a rack and pinion in order that it may be moved toward and away from the fixed jaw when the jaws are positioned at diametrically opposite sides of the cylindrical portion of the work to be measured.

In connection with the above mechanism, a still further object of my invention consists in providing means for turning the pinion to actuate the movable jaw of such a nature that when the movable jaw has been brought into suitable engagement with the work being measured, further movement of the pinion will be prevented.

A still further object of my invention consists in the provision of a centering carriage or plate mounted for reciprocation at right angles to the direction of movement of the movable jaw and coupled to such jaw to have movement in proportion to the movement of the jaw.

A still further object of my present invention consists in providing the pinion carrying shaft with a dial disk coöperating with a scale upon the shank of the movable jaw and thereby providing means for reading the distance between the jaws to relatively small fractions of an inch. In connection with this indicating disk I provide also a second disk in frictional engagement therewith, this second disk being adapted to be adjusted with respect to the scale of the dial disk to facilitate use of the measuring instrument for duplicate work.

With these and other objects in view, such as novel means for adjustably securing the indicating needles with respect to the scale and dial disk, my invention will be more fully described, illustrated in the accompanying drawings, and then specifically pointed out in the claims which are attached to and form a part of this application.

In the drawings: Figure 1 is a perspective view of my improved measuring instrument, showing the measuring jaws somewhat separated; Fig. 2 is an end elevation of the instrument; Fig. 3 is a front elevation; Fig. 4 is a fragmentary sectional view taken on the line 4—4 of Fig. 2; Fig. 5 is a vertical sectional view taken on the line 5—5 of Fig. 3; Fig. 6 is a front elevation of the centering slide or carriage.

Corresponding and like parts are referred to in the following description and indicated in all the views of the drawings by the same reference characters.

My improved measuring instrument includes a frame or body 10, preferably formed of metal and having spaced parallel arms 11 and 12, the free end of the arm 11 having its forward face cut-away to provide a shoulder 13 against which engages one of the squared faces of a contact block 14 forming the fixed jaw of the measuring instrument and secured to the arm by a screw 15 or other suitable fastening device. The opposite arm 12, at its free end is provided with an upwardly directed extension 16 and such end of the arm, together with the extension, has its rear face cut-away to provide a channel 17, rectangular in cross section, extending toward the fixed jaw 14 and adapted to receive the rack bar 18. This rack bar is formed to fit snugly within the channel and is held against displacement from the channel 17 by a locking plate 19 seating in a recess formed in the rear face of the arm 12 and engaging at its free edge in a longitudinal groove or channel 20 formed in the adjacent edge of the rack bar 18, the locking plate being secured by a screw 21 or other equivalent fastening means. That face of the rack bar 18 directed toward the arm 12 is formed throughout the greater portion of its length with rack teeth 22 and the forward face of the rack bar, at its outer end, is cut-away to provide a seat 23 to receive a scale 24 secured in place in any suitable manner. The forward face of the lower end of the rack bar 18 is cut-away to provide a seat 25 to receive a square faced work engaging block 26 which is secured to the seat by a screw 27 and which constitutes the movable jaw of the measuring instrument, being adapted to engage snugly against the jaw 14 when the rack bar is in fully retracted position.

An opening 28 is formed completely through the extension 16 of the arm 12 and the outer face of such extension is provided adjacent this opening with spaced lugs 29 against which the peripheral edge of a bearing disk 30 engages, the disk being secured against turning movement by a clamping plate 31 engaging over its peripheral edge at a point opposite the lugs 29 and secured to the arm 12 by a screw 32. This arrangement permits the disk to be turned through any desired angle and clamped in adjusted position in order that its indicator arm or needle 33, the function of which will be later explained, may be properly adjusted. This bearing disk is formed centrally with a bore to journal a shaft 34 which carries a pinion 35 meshing with the rack teeth 22 of the rack bar 18, the teeth of the pinion being preferably cut directly in the shaft 34 because of the delicacy of the parts. This shaft extends laterally from the central portion of a dial disk 36 which bears against the rear face of the arm 12 and its extension 16 and the shaft 34 is further supported by means of a bearing block 37, preferably formed of relatively soft metal and cutaway, as shown at 38, to receive the pinion 35. When the instrument is assembled, this bearing block 37 is supported between the bearing plate 30 and dial disk 36 and is held in close engagement with the pinion 35 and rack 22 by means of a leaf spring 39 secured by a screw 40 at one end to the upper portion of the extension 16 and bearing at its other end against that face of the bearing block 37 more remote from the rack. The same screw 40 which secures this leaf spring 39 in position also passes through an eye 41 formed upon a second indicating needle 42, the free end of which is bent laterally to extend in juxtaposition to the divisions 43 of the scale 24. As will be readily seen, this manner of securing the indicating needle 42 permits proper adjustment of the needle to bring it into correct position relative to the scale.

Mounted upon that end of the shaft 34 which extends through the bearing plate 30 are co-acting friction disks 44 and 45, the former being loosely mounted about the shaft and engaging the bearing plate 30 and the latter being locked to the shaft by a set screw 46 or other suitable fastening means. A cup-shaped housing 47 surrounds these disks 44 and 45, being spaced at its outer end from the disk 45 and this housing is secured to the disk 44 by means of a plurality of set screws 48 passed through the wall of the housing and engaging in cutaway seats 49 formed in the peripheral edge of the disk 44. It will be seen that this manner of fastening the housing to the disk 44 not only insures rotation of the disk 44 upon turning movement of the housing, but also prevents disengagement of the housing from the remainder of the instrument as the inner ends of the set screws 48, even if they slip somewhat upon the seats 49 of the disk 44, will engage the inner face of the disk 45, which is in turn locked to the shaft 34.

Extending axially from the outer end of the housing 47, and fixedly secured to the housing, is a knurled thimble 50 which may be grasped by the thumb and finger of the operator and which serves as a means for rotating the housing 47. A helical spring 51 engages between the outer friction disk 45 and housing 47 to hold the disks 44 and 45 into frictional engagement in such a manner that unless considerable resistance is offered to the movement of the rack bar 18, turning of the thimble 50 in either direction will cause a corresponding turning of the shaft 34 and reciprocation of the rack bar 18. At the same time, if force is exerted against the movable jaw 26, tending to prevent its movement toward the jaw 14, as would be the case when an article to be measured was interposed between the jaws and the jaws brought against such article, it will be clear that the friction disks 44 and 45 may slip with respect to each other and the thimble 50 rotated without imparting movement to the shaft 34. A pin 52, projecting from the outer edge of the rack bar 18, serves to limit the movement of the rack bar and, consequently, of the movable jaw 26 away from the fixed jaw 14.

The dial disk 36 is provided with a peripheral flange 53 upon which is inscribed a scale 54, each division of which indicates a certain predetermined fractional part of an inch. Preferably, the pinion 35 is so proportioned that the shaft 34 and, consequently, the dial disk 36 will be revolved four times in causing each one inch travel of the rack bar 18 and jaw 26 carried thereby and the scale 54 is, consequently, divided into 250 equal scale divisions in order that each division may indicate one-thousandth of an inch, the instrument of course being originally so assembled that the zero division of the indicating dial 36 will be in alinement with the adjacent terminal of the indicating needle 33 when the jaws are together and that the indicating needle 42 will have its terminal disposed directly at the zero end of the scale 24 under the same circumstances.

By reference to Fig. 5 of the drawings, it will be seen that the inner face of the dial disk 36 is cut-away to provide a hub portion 55, the peripheral face of which is provided with a groove or channel 56 to seat a split resilient ring 57 and a duplicating dial disk 58 is frictionally locked to the main dial disk 36 by engagement with the ring 57 when the disk 58 is seated about the hub 55. The duplicating dial disk 58 preferably projects peripherally beyond the dial disk 36 and has its edge knurled, as shown at 59, in order that it may be turned independently of the dial disk 36. At one point, however, the periphery of the disk 58 is cut-away to extend tangentially to the flange 53 of the disk 36 and the face 59' thus formed is provided with an indicating notch 60 which may be brought into alinement with any one of the scale divisions 54 of the dial disk 36. When duplicate pieces of work or duplicate portions of the same piece of work are to be measured, this duplicate dial disk may be turned to bring its notch 60 in alinement with the proper division of the dial disk 36 in order that the operator may readily determine when the jaws have been brought to their proper relative positions, that is, when the notch 60 has been brought opposite the indicator needle 33.

One of the chief difficulties in instruments for measuring round work consists in making certain that the work engaging jaws are brought into engagement with the work at diametrically opposite points and not at one side or the other of such points. Up to this time this defect has rendered employment of such instruments very difficult if not impossible in the measurement of rotating work and to overcome this difficulty I provide the centering slide or carriage, indicated as a whole by the numeral 61. This slide is in the form of a rectangular metal plate having its end edges beveled, as shown at 62 to engage beneath the undercut shoulder 63 formed by cutting away the outer face of the arm 11 adjacent its upper edge and beneath the shoulder 64 formed by the beveled edge of a plate 65 secured in a recess 66 formed in the arm 12 of the instrument, the plate 65 being fastened by screws 67 or other suitable means. To further insure proper support of the centering slide and also to permit convenient grasping of the instrument, without interference with the slide, I provide a face plate 68 secured at its ends to the arm 11 and arm 12 and forming a guide for the slide.

The slide 61 is provided with a diagonally formed groove or channel 69 in its outer face in which seats a roller 70 carried by the free end of an arm 71, the opposite end of which is bent rearwardly and secured in a recess 72 formed in the outer face of the rack bar 18, a screw or other suitable fastening device 73 being utilized to connect the arm 71 with the rack bar. This arm is secured to the rack bar in such a position, is so proportioned, and the diagonal channel 69 is formed at such an angle that any movement of the rack bar and, consequently, of the movable jaw 26 will cause the carriage to move to one-half the distance of the movement of the jaw 26. When the jaws are together, the outer edge of the centering slide 61, which is located in a plane in front of the jaws, intersects the abutting faces of the jaws and, consequently, when the jaws are moved to any distance from each other, the same edge of the centering slide will be spaced from a line extending between the centers of the faces of such jaws a distance equal to one-half the distance between the jaws.

From the foregoing description, particularly if reference is had to the drawings, the operation of my improved measuring instrument will be readily understood. When an article is to be measured, the thimble 50 is turned in such a manner as to separate the jaws to a distance somewhat greater than the diameter of the work to be measured. The instrument is then applied to the work in such a manner that its fixed jaw 14 and outer edge of the centering slide 61 engage against the periphery of the work when the thimble is counterrotated to bring the movable jaw into engagement with the work, the other jaw and slide being kept constantly in engagement therewith. As soon as the jaws are brought into simultaneous engagement with the work, by means of rotation of the thimble, the resistance offered to further movement of the rack bars 18 will cause slippage of the clutch formed by the friction disks 44 and 45 and, consequently, prevent any possibility of injury to the rack or pinion through further attempts to turn the thimble 50. The diameter of the work being measured may then be read from the scales 43 and 54 either while the instrument is still in engagement with the work or after it has been removed therefrom. It will of course be clear that the scale 43, which is preferably provided into eighths of inches will indicate the number of inches which the jaws are spaced apart and also, because of its divisions, the number of times through which the dial disk 36 has been turned and, consequently, the number of thousandths of an inch which should be added to the reading of the dial disk.

Having thus described the invention, what is claimed as new is:

1. A measuring instrument including a body having spaced arms, a jaw mounted at the free end of one arm, a rack bar reciprocally mounted through the free end of the other arm and movable toward and away from the jaw, a second jaw carried by the rack bar, and means for reciprocating the rack bar to bring the jaws together, said means including a shaft, a pinion carried by the shaft and meshing with the teeth of the rack bar, a friction disk carried by the shaft, a second friction disk loosely mounted on the shaft and engaging the first, and means for rotating the second friction disk.

2. A measuring instrument including a body having spaced arms, a jaw mounted at the free end of one arm, a rack bar reciprocally mounted through the free end of the other arm and movable toward and away from the jaw, a second jaw carried by the rack bar, and means for reciprocating the rack bar to bring the jaws together, said means including a shaft, a pinion carried by the shaft and meshing with the teeth of the rack bar, a friction disk carried by the shaft, a second friction disk loosely mounted on the shaft and engaging the first, means for rotating the second friction disk, and means yieldably holding the friction disks in engagement with each other.

3. A measuring instrument including a body member having spaced arms, a jaw carried by one arm, a rack bar reciprocally mounted in the other arm, a jaw carried by the rack bar and movable toward and away from the first jaw, a shaft having a pinion meshing with the rack bar, a friction disk secured to the shaft, a second friction disk loose on the shaft, a rotatable housing inclosing the disks and secured to the second friction disk, a spring seating between the housing and one of the disks, a scale carried by the rack bar, and a dial disk carried by the shaft and provided peripherally with a scale.

4. A measuring instrument including a body member having spaced arms, a jaw carried by one arm, a rack bar reciprocally mounted in the other arm, a jaw carried by the rack bar and movable toward and away from the first jaw, a shaft having a pinion meshing with the rack bar, a friction disk secured to the shaft, a second friction disk loose on the shaft, a rotatable housing inclosing the disks and secured to the second friction disk, a spring seating between the housing and one of the disks, a scale carried by the rack bar, a dial disk carried by the shaft and provided peripherally with a scale, and an indicator needle co-acting with the scale of the dial disk.

5. A measuring instrument including a body member having spaced arms, a jaw carried by one arm, a rack bar reciprocally mounted in the other arm, a jaw carried by the rack bar and movable toward and away from the first jaw, a shaft having a pinion meshing with the rack bar, a friction disk secured to the shaft, a second friction disk loose on the shaft, a rotatable housing inclosing the disks and secured to the second friction disk, a spring seating between the housing and one of the disks, a scale carried by the rack bar, a dial disk carried by the shaft and provided peripherally with a scale, and an indicator needle co-acting with the scale of the dial disk, said indicator needle being adjustably mounted upon the shaft, whereby its free end may be swung to different parts of the periphery of the dial disk.

6. A measuring instrument including a jaw, a second jaw movable toward and away from the first, means for actuating the second jaw, and a dial disk adapted to be rotated by such actuating means.

7. A measuring instrument including a fixed jaw, a second jaw movable toward and away from the first, means for actuating the second jaw, and a dial disk adapted to be rotated by such actuating means, said dial disk being provided peripherally with a scale, an indicating needle co-acting with the scale, and a duplicate dial disk carried by the first disk.

8. A measuring instrument including a jaw, a second jaw movable toward and away from the first, means for actuating the second jaw, and a dial disk adapted to be rotated by such actuating means, said dial disk being provided peripherally with a scale, an indicating needle co-acting with the scale, and a duplicate dial disk carried by the first disk, said duplicate dial disk being frictionally supported by the first to normally move therewith while still free for independent movement.

9. A measuring instrument including a body, a jaw carried by the body, a rack bar reciprocally mounted in the body, a second jaw carried by the rack bar and co-acting with the first jaw, said body being formed with a recess, a shaft manually rotatable extending through the body, a pinion on the shaft meshing with the rack bar, a bearing block seated in a recess in the body and engaging about the pinion, and means yieldably holding the bearing block in place.

10. A measuring instrument including a fixed jaw, a movable jaw, and a slide movable at right angles to the path of movement of the movable jaw and controlled by movement of such jaw.

11. A measuring instrument including a body, a fixed jaw carried by the body, a second jaw carried by the body and movable toward and away from the first, whereby the jaws may be brought into engagement with opposite sides of work being measured, and means for automatically insuring engagement of such body at diametrically opposite points by the jaws.

12. A measuring instrument including a body, a fixed jaw carried by the body, a second jaw carried by the body and movable toward and away from the first, whereby the jaws may be brought into engagement with opposite sides of work being measured, and means for automatically insuring engagement of such body at diametrically opposite points by the jaws, said means being controlled by the movable jaw.

13. A measuring instrument including a body, a fixed jaw carried by the body, a second jaw carried by the body and movable toward and away from the first, whereby the jaws may be brought into engagement with opposite sides of work being measured, and means for automatically insuring engagement of such body at diametrically opposite points by the jaws, said means being controlled by the movable jaw and including a centering slide movable at right angles to the path of movement of the second jaw, and operative connection between the second jaw and slide.

In testimony whereof I affix my signature.

WESTON R. SMITH. [L. S.]

Copies of this patent may be obtained for five cents each, by addressing the "Commissioner of Patents, Washington, D. C."